July 25, 1967 P. DE VINCENT 3,332,657
FREEZING TRAY AND ICE EJECTING GRID
Filed April 26, 1965 2 Sheets-Sheet 1
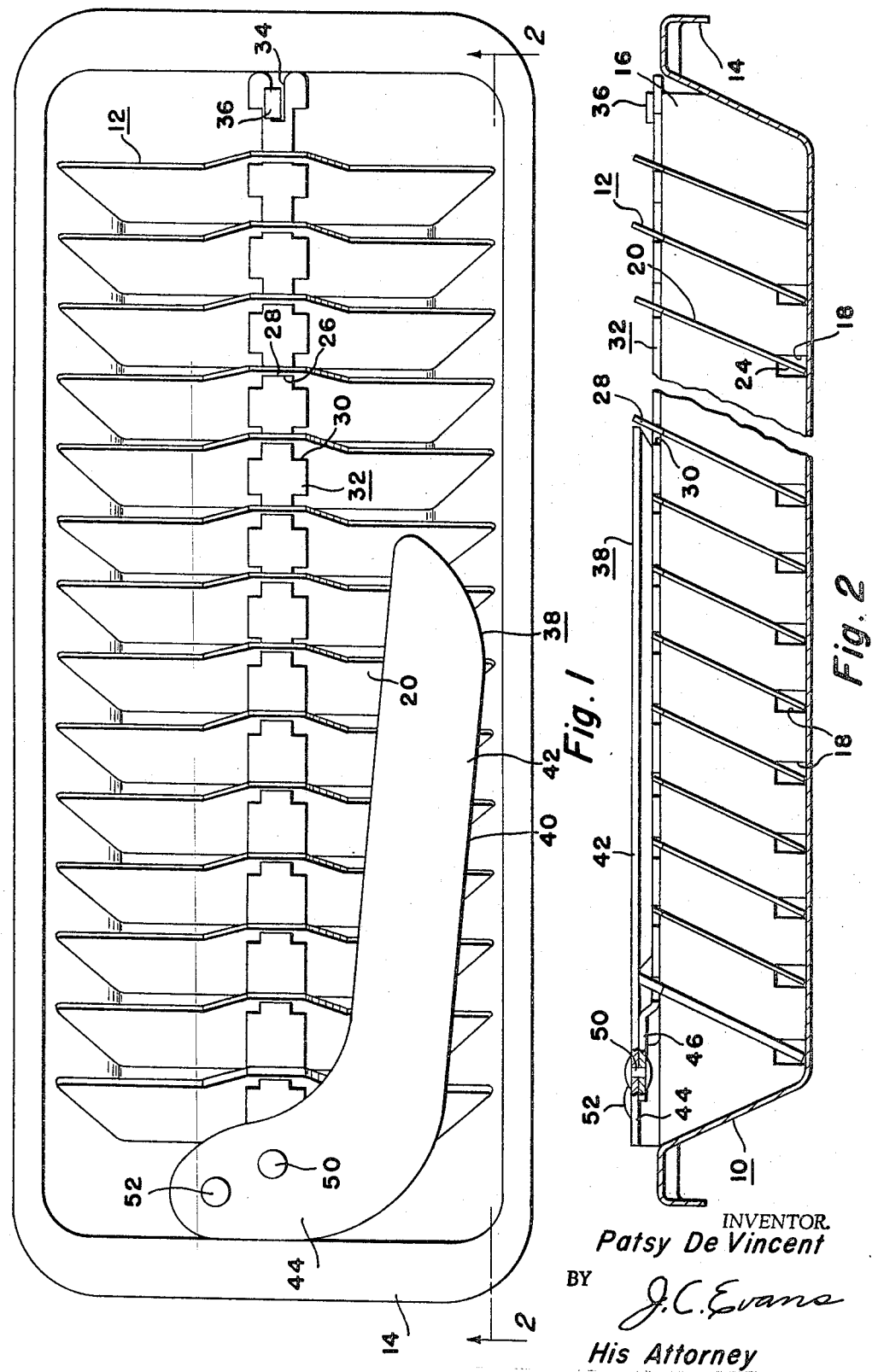
INVENTOR.
Patsy De Vincent
BY
J.C. Evans
His Attorney July 25, 1967 P. DE VINCENT 3,332,657
FREEZING TRAY AND ICE EJECTING GRID
Filed April 26, 1965 2 Sheets-Sheet 2
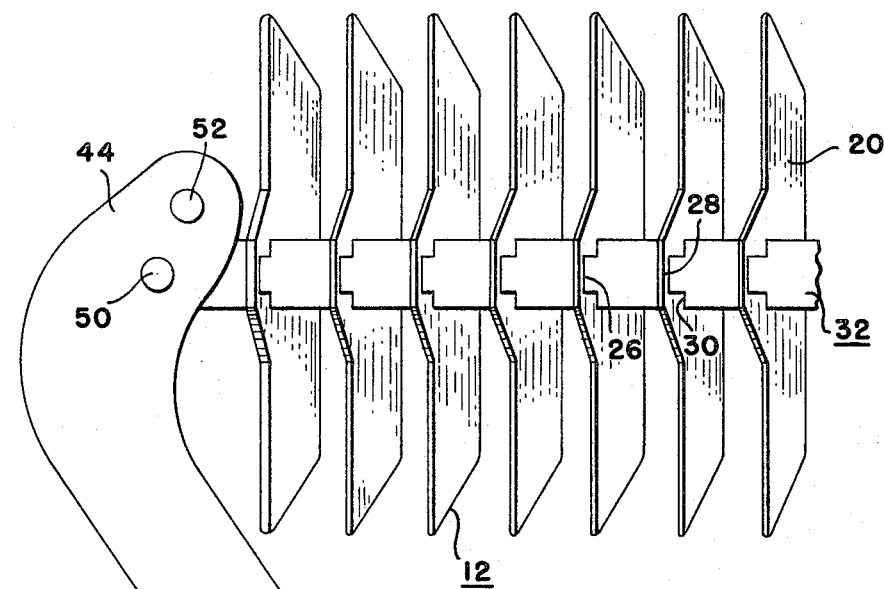
Fig. 3
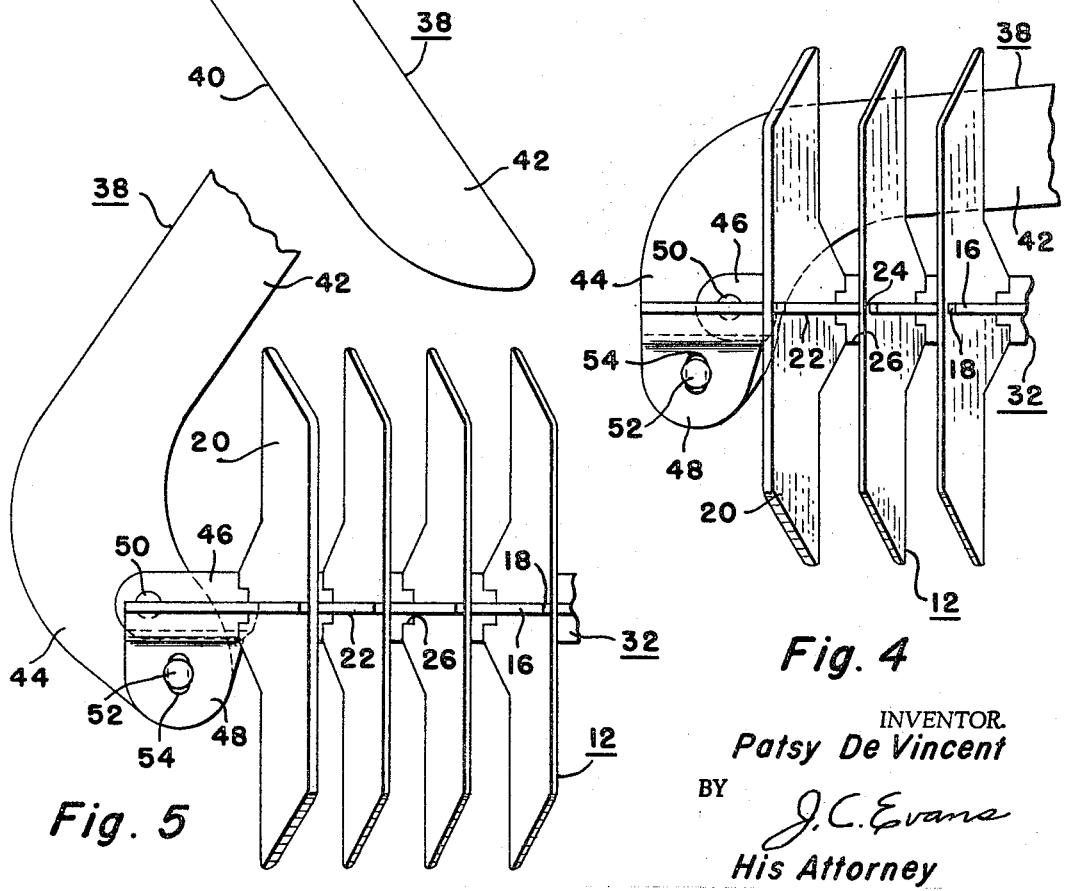
Fig. 4
Fig. 5
INVENTOR.
Patsy De Vincent
BY J.C. Evans
His Attorney United States Patent Office 3,332,657
Patented July 25, 1967

3,332,657
FREEZING TRAY AND ICE EJECTING GRID
Patsy De Vincent, Dayton, Ohio, assignor to General Motors Corporation, Detroit, Mich., a corporation of Delaware
Filed Apr. 26, 1965, Ser. No. 450,863
1 Claim. (Cl. 249—71)

ABSTRACT OF THE DISCLOSURE

In preferred form a freezing tray and an ice ejecting grid having horizontal members interconnected by a longitudinal partition, a flat reduced height actuator bar interconnecting the horizontal members and movable relative to the longitudinal partition to progressively advance the horizontal members during ice ejection and wherein a low profile outwardly swinging horizontal handle forms a support surface with the horizontal members and is connected to the actuator bar by a low profile linkage to produce ice ejection.

---

This invention relates to freezing devices of the tray and grid type and more particularly to new and useful improvements in the grid structure thereof.

In freezing devices that include a grid structure having a longitudinal partition wall and cross partition walls that are normally inclined from the vertical and movable into a forward tilted position to loosen the cross walls from the ice contents of the freezing device, it is recognized that it is advantageous to provide a longitudinally directed actuator bar of the type that selectively contacts the cross walls to produce the ice ejecting effect. In many cases the actuator bar is associated with a vertically actuatable handle operatively connected to the bar in various fashions to produce longitudinal movement thereof with respect to the grid structure for producing ejection. Such vertically actuatable handles necessarily increase the overall height of the freezing tray and moreover often present an upper surface configuration that can cause tipping movement of a like freezing device that might be stacked thereon.

Accordingly, an object of the present invention is to improve freezing devices of the type having a tray and a grid structure including a unitary longitudinally directed partition and a plurality of spaced cross walls wherein the cross walls are actuated by a longitudinally directed actuator bar from a normally inclined position with respect to the vertical into a forwardly tilted position for loosening the cross walls from frozen contents of the device by the provision of a horizontally actuatable handle that is operatively connected to the elongated longitudinally directed actuator bar for causing relative movement thereof with respect to the longitudinal partition wherein the horizontally actuatable handle is nested on one side of the longitudinal partition below the upper surface of the cross walls so as to produce a freezing device having a low vertical profile.

Another object of the present invention is to improve freezing devices of the type including an ice tray having a unitary grid structure therein including a unitary longitudinally directed partition and a plurality of spaced cross walls normally disposed at an inclination from the vertical and movable into a forwardly tilted position by a longitudinally directed horizontally disposed actuator bar by the provision of a horizontally actuatable handle including an elongated member disposed in spaced parallelism to the longitudinally directed partition on one side thereof and including an upper surface substantially flush with the uppermost edges of the cross walls to form in cooperation therewith a stable flat supporting surface on the upper part of the grid structure for supporting the tray of a like freezing device without tipping with respect thereto.

Still another object of the present invention is to improve freezing devices of the type including a tray and a unitary grid structure including a unitary one-piece longitudinal partition and a plurality of cross members normally disposed at an inclination from the vertical and movable by an elongated longitudinally directed actuator bar into a forwardly tilted position for releasing ice in the container from the cross walls by the provision of a horizontally disposed actuator handle including an elongated end portion disposed in a nested relationship over the tops of a plurality of the cross members so that its upper surface is substantially disposed at the same level as the uppermost edge portions of the cross walls and an inwardly formed offset end that is operatively connected between the longitudinally directed partition and the horizontally disposed longitudinally directed actuator bar by a low height linkage actuatable on sideways movement of the elongated handle end portion to one side of the grid structure to cause the actuator bar to slide with respect to the longitudinal partition to produce the ice ejecting movement of the cross walls.

Further objects and advantages of the present invention will be apparent from the following description, reference being had to the accompanying drawings wherein preferred embodiments of the present invention are clearly shown.

In the drawings:

FIGURE 1 is a plan view of the grid and tray of the present invention showing all the parts in their freezing position.

FIGURE 2 is a view in vertical section taken along the line 2—2 of FIGURE 1 looking in the direction of the arrows.

FIGURE 3 is a fragmentary, top plan view of the grid structure showing its parts in their ice releasing position.

FIGURE 4 is a fragmentary view in elevation of the underside of the grid structure in FIGURE 1 with the parts in their freezing position.

FIGURE 5 is a view in elevation of the underside of the grid structure in FIGURE 3 showing the parts in their ice releasing position.

Referring now to FIGURES 1 and 2, a freezing device is shown including a tray 10 having a grid structure 12 removably supported therein.

The tray 10 is stamped from sheet metal and includes a bottom wall and opposed upright side and end walls. The tray side and end walls diverge outwardly from their bottoms to their tops and have their upper edge rolled or bent over to provide a rim 14 around the upper edge at the top of the tray.

The grid structure 12 within the tray 10 includes a rigid or inflexible metal longitudinal partitioning wall 16 (see FIGURE 2) having a plurality of spaced apart notches 18 formed in its bottom edge. A plurality of separate rigid or inflexible metal cross walls 20 are directed transversely with respect to the longitudinal partitions 16 and are each provided with a vertically elongated closed wall keyhole 22 (see FIGURE 4) through which the longitudinal partition wall 16 extends. The cross walls 20 are assembled to the longitudinal wall 16 for tilting movement relative thereto and are loosely connected with respect to the longitudinal partition 16 by the portion of the partition forming the notches 18 that are located on either side of a continuous web portion 24 formed across the bottom of each of the cross walls 20 below the openings 22 to be located through the notches 18.

Each of the cross grid walls 20 is also provided with horizontally elongated openings 26 formed in a raised centrally located top portion 28 on each of the wall portions 20, each of which receives a web portion adjacent the open slot 30 in a flat horizontally disposed actuating bar or member 32 supported on the upper edge of the longitudinal partition 16 for sliding movement with respect thereto. The slots 30 are formed on either side of the bar 32 as best seen in FIGURE 1 and are longitudinally spaced apart and are progressively wider relative to one another from the front to the rear end of the grid structure. At the rear end of the bar 32 a slot 34 is formed to receive a bent-over end 36 on the upper partition 16 for guiding the end of the bar 32 at this location.

The cross members 20, as best seen in FIGURES 1 and 2, are normally positioned at an inclination from the vertical to form the plurality of compartments for freezing liquid to ice. Upon relative movement of the actuating bar 32 toward the front of the tray, the portion of the bars 32 forming the slots therein progressively engage the cross members to move them to a forwardly tilted position to release ice in the containers therefrom. This type of progressive releasing action is more specifically set forth in United States Patent 2,642,726 issued June 23, 1953 to Frei.

The above described combination of a longitudinal partition 16 and cross walls 20 in cooperation with a slidable longitudinally directed actuator bar 32 has been found highly desirable from the standpoint of readily releasing a large number of ice segments from a grid structure of the type illustrated.

In accordance with certain principles of the present invention, the advantageous releasing action of the grid structure 12 is maintained in a low profile ice tray configuration made possible by the provision of an improved horizontally disposed ice release handle 38 including an elongated end portion 40 disposed when the grid structure 12 is in its freezing position generally parallel to the longitudinal axis of the grid structure 12 as best seen in FIGURE 1. The handle end portion 40 is nested below the raised portions 28 on the cross walls 20 on one side thereof so that an upper surface 42 thereon is disposed substantially at the same level as the tops of the raised portions 28 whereby the handle 40 and the cross walls 20 in cooperation form a substantial horizontal surface for supporting the underside of a tray 14 in a like freezing device so that the supported freezing device is stabilized against tipping movements when it is stacked on the surface 42 and the tops of the cross members 20.

Another feature of the improved handle 38 is the provision of a low profile connection between the handle 38 and the actuator bar 32 of the grid structure 12 including a flat end portion 44 on the handle 38 that is offset from the end portion 40. The flat end portion 44 cooperates with an upwardly directed flat end portion 46 on the front end of the actuator bar 32 and a flat bent-over extension 48 on the front end of the partition 16 that is directed from the upper edge thereof to one side thereof as best seen in FIGURES 4 and 5. The end portion 44 is pivotally connected to the upwardly directed actuator bar end portion 46 by a pin 50 that is representatively shown as being riveted through the handle end portion 44 and the bent portion 46 on the actuator bar 32 as best seen in FIGURE 2. The terminus of the handle end portion 44 is pivotally connected to the bent extension 48 on the partitions 16 by a pivot pin 52 that is riveted through the terminus of the handle end portion 44 to be directed through an elongated opening 54 in the extension 48 to allow for a predetermined amount of lost motion movement between the extension 48 and the terminus of the handle 40.

By virtue of this construction, when the low profile handle 38 is located as shown in FIGURES 1 and 2, the longtudinally directed actuator bar 32 is positioned to allow the cross wall members 20 to be disposed at an inclination from the vertical as best seen in FIGURE 2. Following freezing of water in the compartments of the grid structure 12 and when it is desired to release ice from the grid 12 the handle 32 is moved sideways as shown in FIGURE 3 whereby the pivot pin 50 is shifted forwardly with respect to the grid structure 12 to cause the actuator bar 32 to slide on the top edge of the partition 16 so as to progressively cause the portions of the actuator bar 32 forming the variable width slots 30 therein to progressively contact each of the cross walls 20 as more particularly set forth in the above cited Frei patent to move the cross walls 20 into a forwardly tilted position as best seen in FIGURE 3 whereby the ice in the compartments of the grid 12 is released from the cross walls 20 for extraction from the grid structure 12.

The above illustrated low profile handle 38 and low profile linkage between the handle 38 and the actuator bar 32 as indicated above is characterized first of all by a reduced vertical height in the freezing device 10. Secondly, the construction provides a substantial surface area for stacking a like freezing device on top of the grid and handle construction so as to prevent any tipping movement of the stacked freezing device with respect to the supporting surface area. By the provision of the low profile configuration of the freezing device 10, the unit occupies a lesser amount of freezer space that can be used for other purposes in the freezer.

The handle 38 is integrally associated with the grid structure 12 and when in its freezing position is nested with respect to the grid structure 12 as discussed above in an out-of-the-way position.

Finally, the above described connectoin between the horizontally actuatable handle 38 and the longitudinally directed actuator bar 32 enables ice to be released from the grid structure 12 with a minimum amount of effort. The particular linkage between the improved handle 38 and the actuator bar 32 moreover is economical to manufacture and assemble and produces a low profile linkage between the handle 38 and the actuator bar 32 that in no ways interferes with the desired low profile characteristics of the device 10.

While the embodiments of the present invention as herein disclosed constitute preferred forms, it is to be understood that other forms might be adopted.

What is claimed is as follows:

A freezing device comprising in combination, a tray, a unitary grid structure in said tray dividing the interior thereof into ice block compartments and removable therefrom as a unit, said grid structure including a one-piece longitudinal partition and a plurality of spaced apart substantially inflexible walls each having an opening therein through which said longitudinal partition is directed, each of said walls being directed transversely of said longitudinal partition and being normally inclined with respect to the vertical, means for pivotally connecting each of said walls to said longitudinal partition, an elongated longitudinally directed flat actuator bar having a plurality of spaced apart openings therein, said horizontal actuating bar lying in a horizontal plane and being directed through the opening in said transverse wall portions and being slidably disposed upon the upper edge of said longitudinal partition, each of said transverse wall portions having a raised center portion adapted to be engaged with a portion of said flat actuator bar upon relative movement thereof with respect to said transverse grids, said raised center portions being located above said flat actuator bar, an actuator handle having an elongated end portion normally disposed in spaced parallelism with said longitudinally directed flat actuator bar on one side of said raised center portions of said transverse wall members, said elongated end portion being disposed below said raised center portions on said wall members and having an upper surface thereon level with the tops of said raised center portions for forming a surface in conjunction therewith for supporting another freezing device on top of said unitary grid structure, said actuator handle including another end portion offset to said elongated handle end portion, said another end portion having an upper surface level with the top of said raised center portions for extending said support surface, said longitudinal partition having a tab thereon adjacent one end thereof that is located on the upper edge thereof and directed horizontally to one side thereof at a level below said another offset end portion of said handle, a pivot pin connecting said tab to the terminus of said another offset actuator arm end portion, a second pivot pin connecting said another offset actuator arm end portion to one end of said flat actuating bar, said pivot pins being offset with respect to one another to produce relative movement of said elongated flat actuator bar with respect to said longitudinal partition whereby said actuator bar selectively engages each of said transverse partition walls for tilting them forward to loosen them from ice formed in each of said plurality of ice block compartments.

References Cited
UNITED STATES PATENTS

| | | | |
|---|---|---|---|
| 2,201,586 | 5/1940 | Keiper | 249—73 |
| 2,642,726 | 6/1963 | Frei | 249—72 |

J. SPENCER OVERHOLSER, *Primary Examiner.*

R. D. BALDWIN, *Assistant Examiner.*

UNITED STATES PATENT OFFICE
CERTIFICATE OF CORRECTION

Patent No. 3,332,657                      July 25, 1967

Patsy De Vincent

It is hereby certified that error appears in the above numbered patent requiring correction and that the said Letters Patent should read as corrected below.

Column 3, line 75, for "longtudinally" read -- longitudinally --; column 4, line 34, for "connectoin" read -- connection --; line 58, after "said", first occurrence, insert -- transverse --; same line 58, for "partition," read -- partition for loosely connecting each of said walls to said longitudinal partion, --.

Signed and sealed this 12th day of November 1968.

(SEAL)
Attest:

Edward M. Fletcher, Jr.

Attesting Officer

EDWARD J. BRENNER

Commissioner of Patents